US012552003B2

(12) United States Patent
Hyodo

(10) Patent No.: US 12,552,003 B2
(45) Date of Patent: Feb. 17, 2026

(54) ELECTRIC TOOL

(71) Applicant: MAXELL IZUMI CO., LTD., Matsumoto (JP)

(72) Inventor: Keita Hyodo, Matsumoto (JP)

(73) Assignee: MAXELL IZUMI CO., LTD., Matsumoto (JP)

( * ) Notice: Subject to any disclaimer, the term of this patent is extended or adjusted under 35 U.S.C. 154(b) by 0 days.

(21) Appl. No.: 18/856,060

(22) PCT Filed: Mar. 15, 2023

(86) PCT No.: PCT/JP2023/009966
§ 371 (c)(1),
(2) Date: Oct. 11, 2024

(87) PCT Pub. No.: WO2024/062657
PCT Pub. Date: Mar. 28, 2024

(65) Prior Publication Data

US 2025/0249567 A1 Aug. 7, 2025

(30) Foreign Application Priority Data

Sep. 20, 2022 (JP) ................................ 2022-148886

(51) Int. Cl.
*B25F 5/00* (2006.01)
*H02G 1/02* (2006.01)

(52) U.S. Cl.
CPC ............... *B25F 5/005* (2013.01); *H02G 1/02* (2013.01)

(58) Field of Classification Search
CPC .... B25F 5/005; B25F 5/02; B25F 5/00; B25F 5/029
USPC ................................ 173/105, 204, 117, 217
See application file for complete search history.

(56) References Cited

U.S. PATENT DOCUMENTS

2015/0283693 A1* 10/2015 Chiasson ................ B25F 5/005 173/168

FOREIGN PATENT DOCUMENTS

| | | | | | |
|---|---|---|---|---|---|
| JP | H04-007606 | Y2 | | 2/1992 | |
| JP | 2004-180373 | A | | 6/2004 | |
| JP | 2009056571 | A | * | 3/2009 | ................ B25F 5/00 |
| JP | 2022-096387 | A | | 6/2022 | |

OTHER PUBLICATIONS

PCT/ISA/210, "International Search Report for International Application No. PCT/JP2023/009966," May 16, 2023, 4pp.

* cited by examiner

*Primary Examiner* — Jacob A Smith
(74) *Attorney, Agent, or Firm* — HAUPTMAN HAM, LLP

(57) ABSTRACT

An electric tool is configured to obviate operation for routing piping and wiring, to prevent dust from entering a hydraulic pump. The electric tool having a main body and a tool head. The main body having a hydraulic part, an oil tank, a hydraulic pump for feeding hydraulic oil inside the oil tank to the hydraulic part, a motor for driving the hydraulic pump, and a battery for supplying power to the motor. The tool head is operated by hydraulic force of a piston; and a hollow rod part configured to couple the tool head with the main body. The tool head having a processing tool, and a cylinder part includes the piston. The cylinder part and the hydraulic part are connected by a tube part, and wherein the hydraulic part having a partition, and the partition reciprocates along a drive axis of the motor.

3 Claims, 6 Drawing Sheets

ELECTRIC TOOL

RELATED APPLICATIONS

The present application is National Phase of International Application No. PCT/JP2023/009966 filed Mar. 15, 2023, and claims priority from Japanese Application No. 2022-148886, filed Sep. 20, 2022.

TECHNICAL FIELD

The present invention relates to an electric tool used indirect live-line job.

BACKGROUND ART

Conventionally, an electric tool in which a tool head is attached to a front-end of a long operation pole (same as operation rod) has been proposed (PTL 1: JP-A-2004-180373, PTL 2: JP-Y-H04-7606).

CITATION LIST

Patent Literature

PTL 1: JP-A-2004-180373
PTL 2: JP-Y-H04-7606

SUMMARY OF INVENTION

Technical Problem

An electric tool described in PTL 1 has a configuration in which an electric motor and a tool head are coupled in a geared manner to one another via a coupling shaft, thereby being inferior in operability as driving force necessary for live-line job is insufficient in a case of using a long operation rod. An electric tool described in PTL 2 uses hydraulic pressure, thereby obtaining sufficient driving force. However, a hydraulic hose and a power cord need to be coupled to a working vehicle, and routing of piping and wiring is complicated, which brings a burden on an operator. Moreover, there is a problem that dust or air may enter a hydraulic line, and maintenance work is burdensome.

Solution to Problem

The present invention has been accomplished under the circumstance, and an object thereof is to provide an electric tool having a structure with which it is possible to obviate operation for routing piping and wiring and reduce a burden on an operator, to prevent dust or air from entering a hydraulic pump, and thus to achieve stable, highly reliable operation.

As one embodiment, the problem is solved by a solution disclosed below.

The present invention relates to an electric tool. The electric tool having a main body and a tool head. The main body having a hydraulic part, an oil tank, a hydraulic pump for feeding hydraulic oil inside the oil tank to the hydraulic part, a motor for driving the hydraulic pump, and a battery for supplying power to the motor. The tool head is operated by hydraulic force of a piston; and a hollow rod part configured to couple the tool head with the main body. The tool head having a processing tool, and a cylinder part includes the piston. The cylinder part and the hydraulic part are connected by a tube part, and wherein the hydraulic part having a partition, and the partition reciprocates along a drive axis of the motor.

According to this configuration, sufficient driving force is obtainable by using hydraulic force. Further, operation for routing piping and wiring can be obviated to reduce a burden on an operator, and an operation range can be widened by battery-driving. In addition, since the partition is provided to the hydraulic part, dust or air can be prevented from entering the hydraulic pump, and thereby stable, highly reliable operation can be achieved.

The cylinder part preferably includes a first spring built-in to bias the piston in a direction toward the hydraulic pump, and the hydraulic part includes a second spring built-in to bias the partition in a direction toward the hydraulic pump. According to this configuration, when the processing tool returns to the initial position after processing by the tool head, returning speed of the processing tool is increased by using restoring force of the second spring in addition to restoring force of the first spring, and thereby operation speed increases.

In one example, the tube part includes a first coupler and a second coupler, the first coupler is arranged at a front-end of the hollow rod part, and the second coupler is arranged at a back-end of the hollow rod part. Providing the first coupler allows the tool head to be replaced easily. Moreover, providing the second coupler allows maintenance of the tube part to be performed in a separate manner, and the tube part to be assembled easily, which can make the configuration excellent in productivity and maintainability.

In one example, the partition, and the motor are arranged in order in a longitudinal direction, and the main body is provided with a handle arranged along the longitudinal direction. Arranging the handle along the longitudinal direction enables an operator to easily hold the main body, and improves operability.

In one example, the hollow rod part is made of a first insulating material, the tube part includes a hydraulic hose, the hydraulic hose is made of a second insulating material, and the hydraulic hose is contained within the hollow rod part. By the hydraulic hose being built-in the tube part, the size can be reduced. Also, the hydraulic oil has a double insulating structure. Thereby further improving safety.

Advantageous Effects of Invention

According to the present invention, an electric tool having a structure with which it is possible to obviate operation for routing piping and wiring to reduce a burden on an operator, to prevent dust or air from entering a hydraulic pump, and thus to achieve stable, highly reliable operation can be realized.

DESCRIPTION OF EMBODIMENTS

Figure 1:
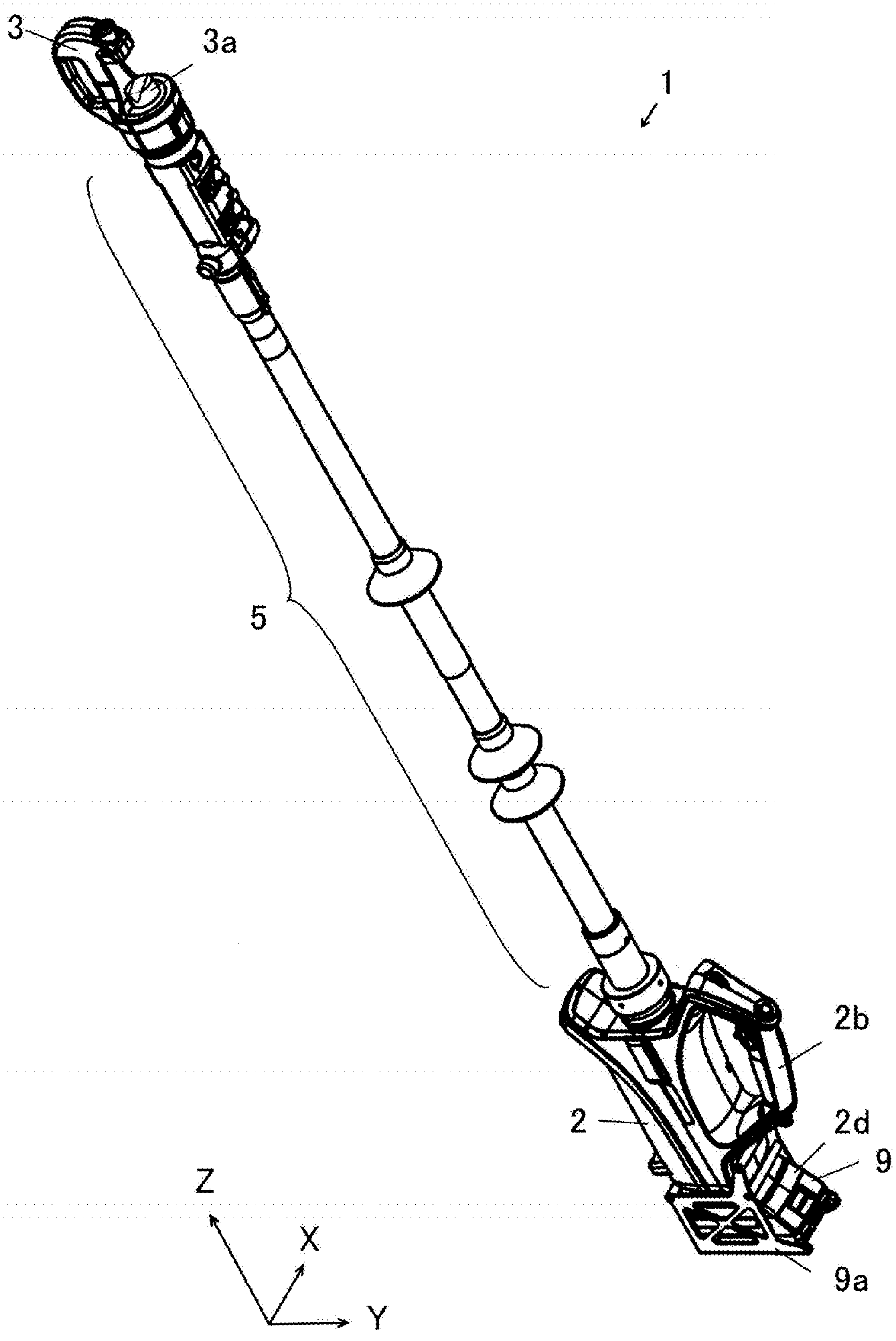
FIG. 1 is a perspective view schematically illustrating an example of an electric tool according to an embodiment.
Figures 2A, 2B, 2C, 2D:
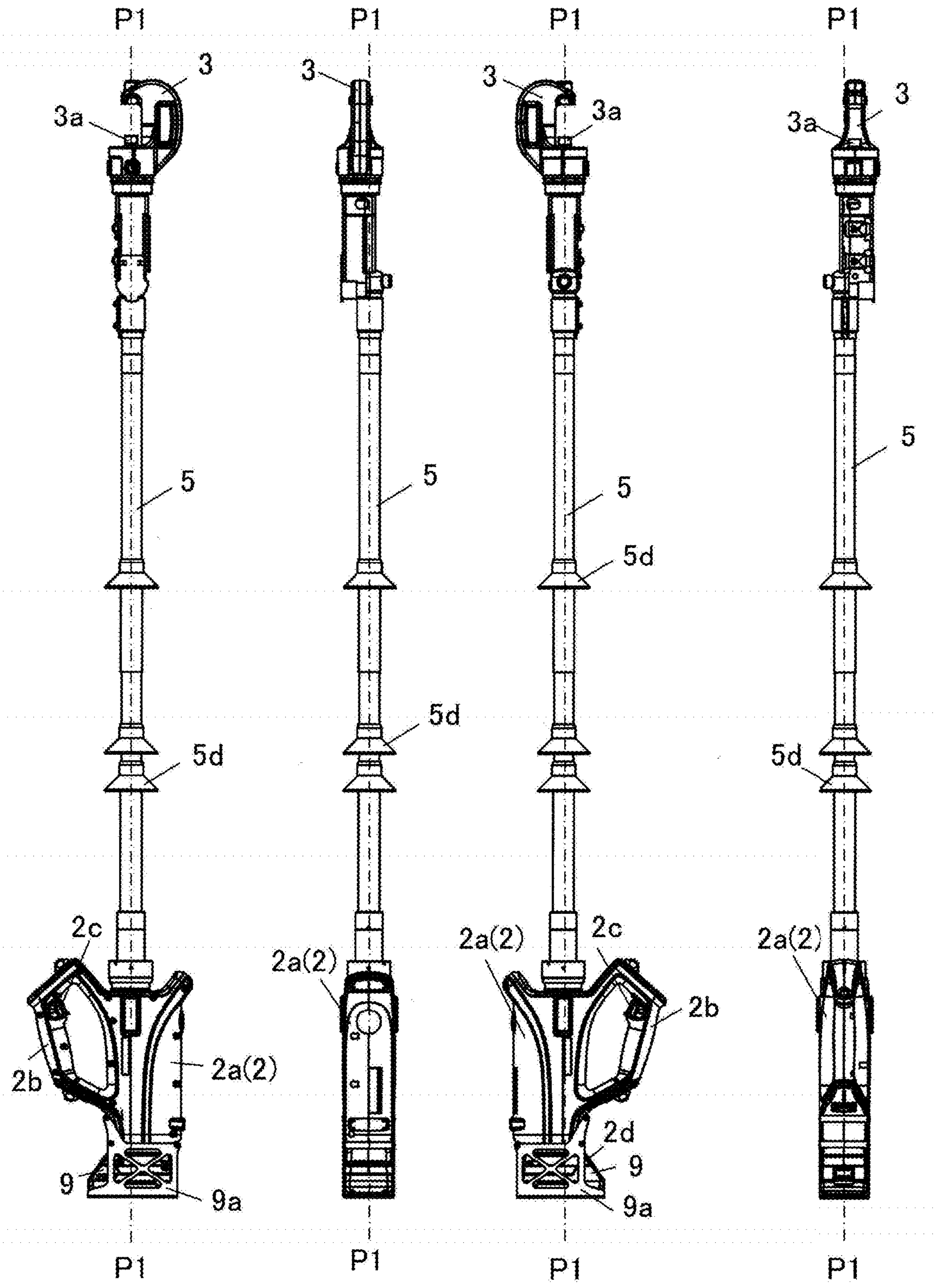
FIG. 2A is a schematic left-side view of the electric tool in FIG. 1.
FIG. 2B is a schematic front view of the electric tool in FIG. 1.
FIG. 2C is a schematic right-side view of the electric tool in FIG. 1.
FIG. 2D is a schematic back view of the electric tool in FIG. 1.

Hereinafter, an embodiment of the present invention is described in detail with reference to the drawings. This embodiment is an electric tool 1 having a configuration in which a tool head 3, a tube part 5, and a main body 2 are coupled to one another, and is a hydraulic tool used in indirect live-line job, such as pressing and crimping work for a over head electric wire and cutting operation for the electric wire. FIG. 1 is a perspective view schematically illustrating an example of the electric tool 1 according to this embodiment. FIG. 2A is a schematic left-side view of the electric tool 1. FIG. 2B is a schematic front view of the electric tool 1. FIG. 2C is a schematic right-side view of the electric tool 1. FIG. 2D is a schematic back view of the electric tool 1. Here, to facilitate the explanation of the positional relationship of parts of the electric tool 1, the directions are indicated by arrows of X, Y, and Z in the drawings. The electric tool 1 operates normally in any direction.

First Example

Figure 3:
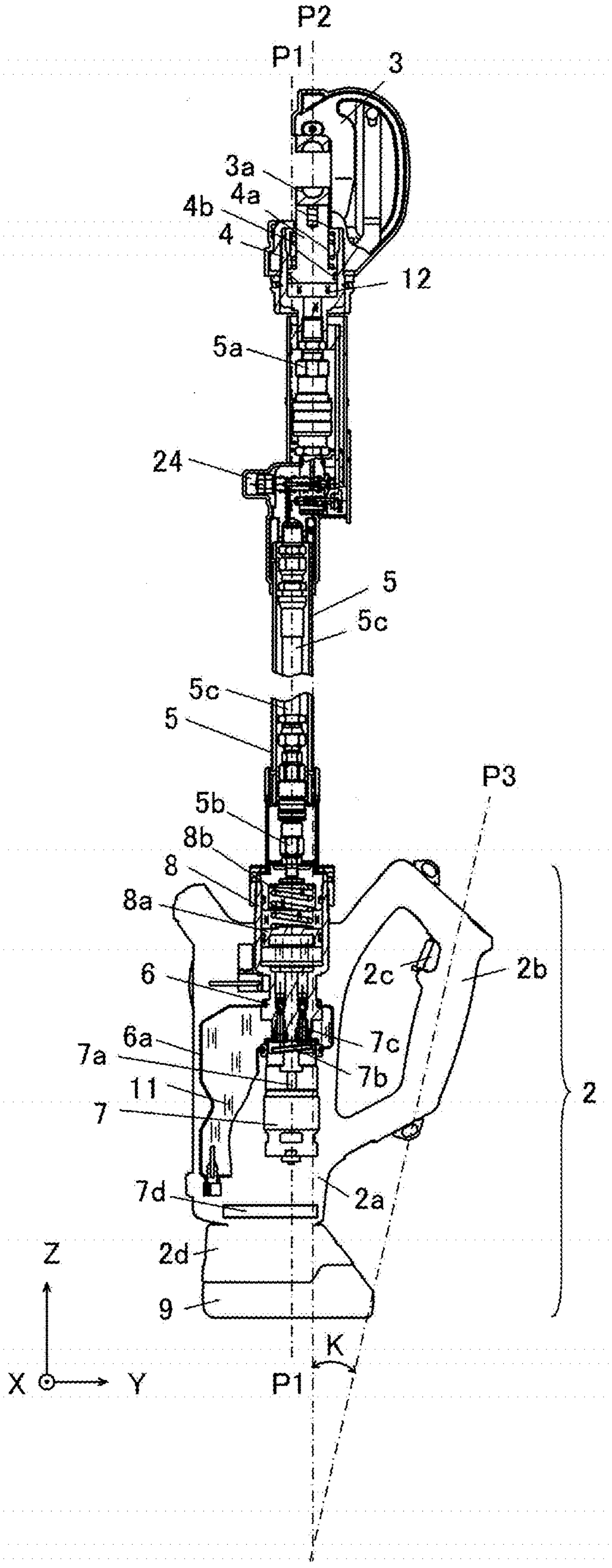
FIG. 3 is a partial section view schematically illustrating a first example of the electric tool in FIG. 1.

FIG. 3 is a partial section view schematically illustrating a first example of the electric tool 1. As illustrated in FIG. 3, the electric tool 1 drives a motor 7 using electric power of a battery pack 9, and drives a hydraulic pump 6 using driving force of the motor 7. In addition, the electric tool 1 has a configuration in which the hydraulic pump 6 feeds first hydraulic oil 11 stored in an oil tank 6*a* to a hydraulic part 8, the first hydraulic oil 11 in a first hydraulic chamber 8*c*1 pushes a partition 8*a* arranged at the hydraulic part 8, and the partition 8*a* pushes second hydraulic oil 12 in a second hydraulic chamber 8*c*2, thereby actuating, via tube part 5*c*, a piston 4*a* in a cylinder part 4 by hydraulic force of the second hydraulic oil 12 to actuate the tool head 3. The electric tool 1 is a portable, cordless type. The partition 8*a* reciprocates in the Z direction along a first axis P1. The piston 4*a* reciprocates in the Z direction along a second axis P2. In one example, the axis P1 and the axis P2 are parallel to one another.

As illustrated in FIG. 3, the electric tool 1 includes the tool head 3 to which a processing tool 3*a* is attached, the tube part 5 that couples the tool head 3, and the main body 2 that is attached to the tube part 5. The tube part 5 includes a first insulation member having a configuration in which insulation coating is formed at an outer circumference and an inner circumference of insulating resin, metal, and the like, and a brim 5*d* is provided at a predetermined interval. The brim 5*d* functions as a limiting brim or a water deflector, and improves an insulation property and a weather-proof property of the tube part 5. In the tube part 5, a first coupler 5*a* is built-in at a front-end side, a second coupler 5*b* is built-in at a back-end side, and the first coupler 5*a* and the second coupler 5*b* are coupled to one another by piping. The tube part 5*c* is a hydraulic hose including a pressure-proof and oil-proof second insulation member, and is built-in the tube part 5. The cylinder part 4 in the tool head 3 is coupled to the first coupler 5*a* in a detachable-and-attachable manner, the first coupler 5*a* is coupled to a joint part 24, the joint part 24 is coupled to the tube part 5*c*, the tube part 5*c* is coupled to the second coupler 5*b*, and the second coupler 5*b* is coupled to the hydraulic part 8 in the main body 2 in a detachable-and-attachable manner, thereby forming a hydraulic line.

In one example, the processing tool 3*a* having a size corresponding to a size of a compression sleeve or a size of a crimp terminal is attached to the tool head 3. The electric tool 1 can perform operation by replacing the tool head 3 in accordance with the intended use, such as compression/cramping processing and cutting process. The joint part 24 is provided in such a manner that the second coupler 5*b* is arranged on the first axis P1, which is in parallel to the second axis P2 passing the first coupler 5*a*. The joint part 24 is configured to hold a locked state and cancel the locked state, and the relative position between the tool head 3 and the main body 2 can be adjusted more freely.

The main body 2 includes a housing 2*a* made of metal or a material combining metal and resin. The hydraulic pump 6, the oil tank 6*a*, the motor 7, and a control circuit 7*d* that controls the motor 7 are provided inside the housing 2*a*. In one example, the hydraulic pump 6 is a piston pump of a swashplate type including a swashplate cam 7*b* that rotates by a drive shaft 7*a* of the motor 7, and a plurality of plungers 7*c* that is arranged around the first axis P1 passing the drive shaft 7*a* and reciprocates along the first axis P1 while being in contact with the swashplate cam 7*b*. Note that the hydraulic pump 6 is not limited to have the configuration using the swashplate cam 7*b*, and a known hydraulic pump is adoptable.

The battery pack 9 includes a secondary battery, such as a lithium-ion battery and a nickel-metal hydride battery, and supplies power to the motor 7 and the control circuit 7*d*. The battery pack 9 is detachably attached to an adapter 2*d*. Moreover, a cage-shaped cover 9*a* that surrounds and protects the battery pack 9 is coupled to the adapter 2*d*. The cover 9*a* is made of metal and has a flat bottom portion, and thereby the electric tool 1 is placeable while leaning against a wall or the like. The battery pack acts as a weight near one's hand, and therefore the center of gravity is located at a position near the operator, resulting in easier balancing of the tool head. Note that the configuration is not limited to this, and the secondary battery 9 may be built-in the main body 2.

In one example, the housing 2*a* is formed with a handle 2*b* and the adapter 2*d*. The handle 2*b* is a handle portion to be gripped by an operator and includes a power switch 2*c* arranged inwardly. The motor 7 becomes an operable state when the power switch 2*c* is pressed. In one example, the control circuit 7*d* is a CPU constituted by a one-chip microcomputer.

A third axis P3 passing a longitudinal direction of the handle 2 *b* and the second axis P2 passing the first coupler 5 *a* are substantially parallel to one another, or intersecting with one another at an acute angle. In the example shown in FIG. 3, an intersecting angle K is 15 degrees or less. This configuration enables the operator to easily grip the handle 2 *b* of the electric tool 1, and improves operability of live-line job.

Figure 4:
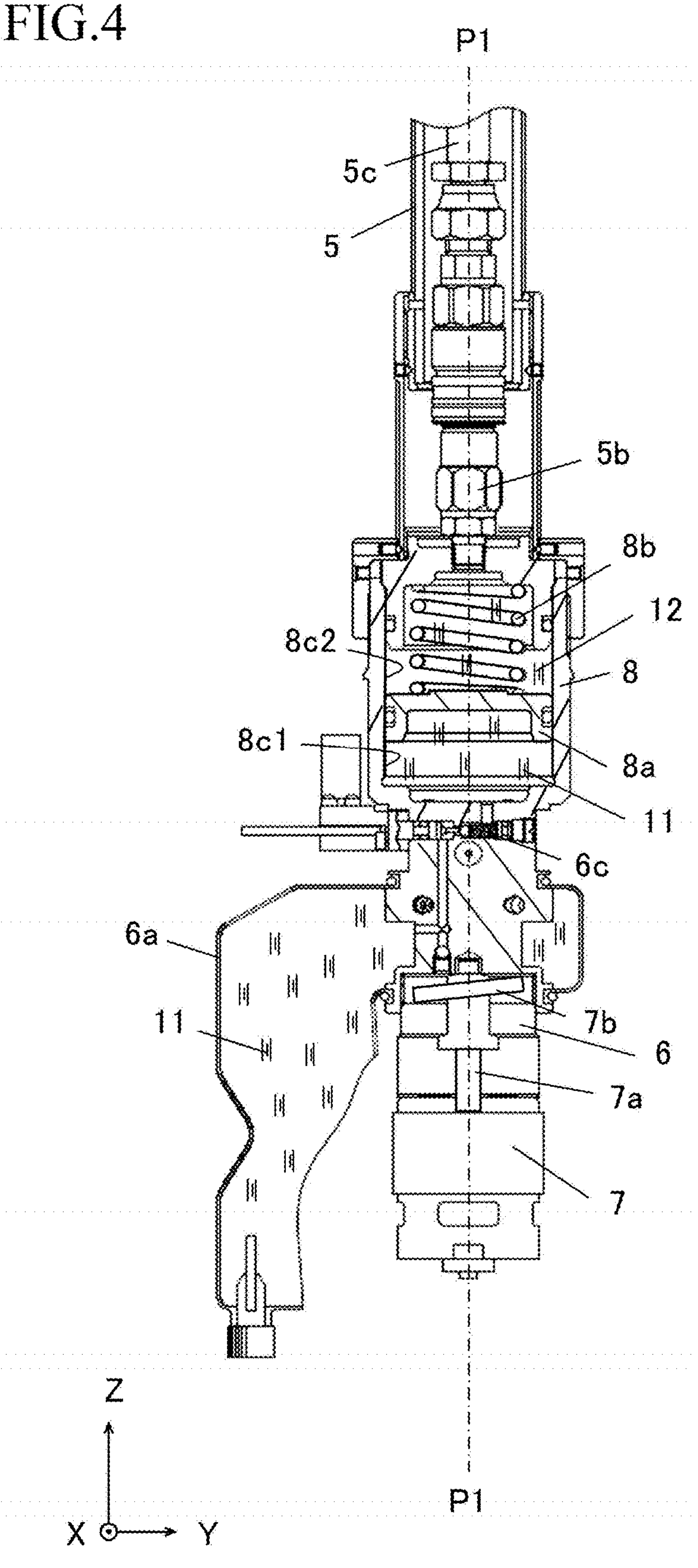
FIG. 4 is a partial section view schematically illustrating, in an enlarged manner, a structure of a hydraulic part of the electric tool in FIG. 3.

FIG. 4 is a partial section view schematically illustrating, in an enlarged manner, a structure of the hydraulic part 8 in the electric tool 1. As illustrated in FIG. 4, the hydraulic pump 6 feeds the first hydraulic oil 11 stored in the oil tank 6*a* to the hydraulic part 8, the first hydraulic oil 11 in the first hydraulic chamber 8*c*1 pushes the partition 8*a* arranged at the hydraulic part 8, and the partition 8*a* pushes the second hydraulic oil 12 in the second hydraulic chamber 8*c*2, thereby actuating, via the tube part 5*c*, the piston 4*a* in the cylinder part 4 by the hydraulic force of the second hydraulic oil 12 to actuate the tool head 3. In this configuration, the first hydraulic oil 11 and the second hydraulic oil 12 are divided by the partition 8*a*. This configuration can prevent dust or air from entering the hydraulic pump 6, and achieves stable, highly reliable operation.

The oil tank 6*a* is arranged at a location where the hydraulic part 8 and the hydraulic pump 6 are coupled to one another. The oil tank 6*a* is in communication with the hydraulic pump 6 with a check valve (not illustrated) interposed therebetween. Moreover, the oil tank 6*a* is in communication with the hydraulic part 8 with a relief valve 6*c* interposed therebetween. The piston 4*a* and the partition 8*a* return to the initial positions upon completion of operation of the tool head 3. The cylinder part 4 includes a first spring 4*b* built therein to bring back the piston 4*a* to the initial position. The hydraulic part 8 includes a second spring 8*b* built therein to bring back the partition 8*a* to the initial position. According to this configuration, when the processing tool 3*a* returns to the initial position after processing by the tool head 3, returning speed of the processing tool 3*a* increases by using restoring force of the second spring 8*b* in addition to restoring force of the first spring 4*b*, and thereby operation speed increases.

Figure 6:
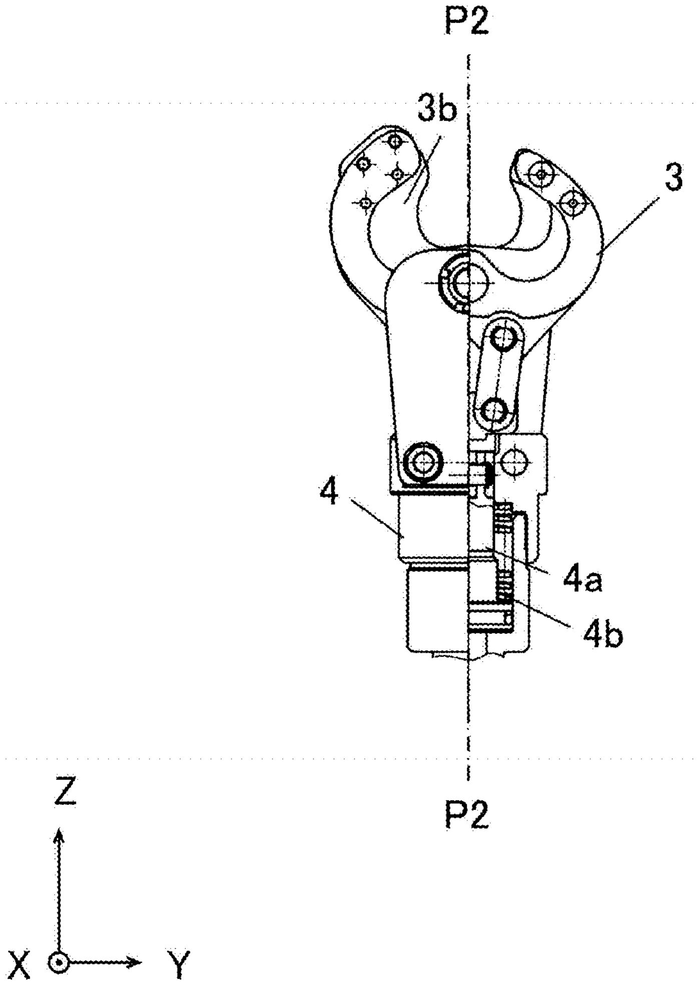
FIG. 6 is a partial section view schematically illustrating another example of the tool head.

FIG. 6 is a partial section view schematically illustrating another example of the tool head 3. FIG. 6 shows an example in which the processing tool 3*b* in the tool head 3 is a cutting blade for an electric wire. In this embodiment, the tool head 3 is replaceable in accordance with pressing and crimping work for an electric wire, cutting operation for an electric wire, sheath stripping operation for an electric wire, or other known indirect live-line job.

Second Example

Figure 5:
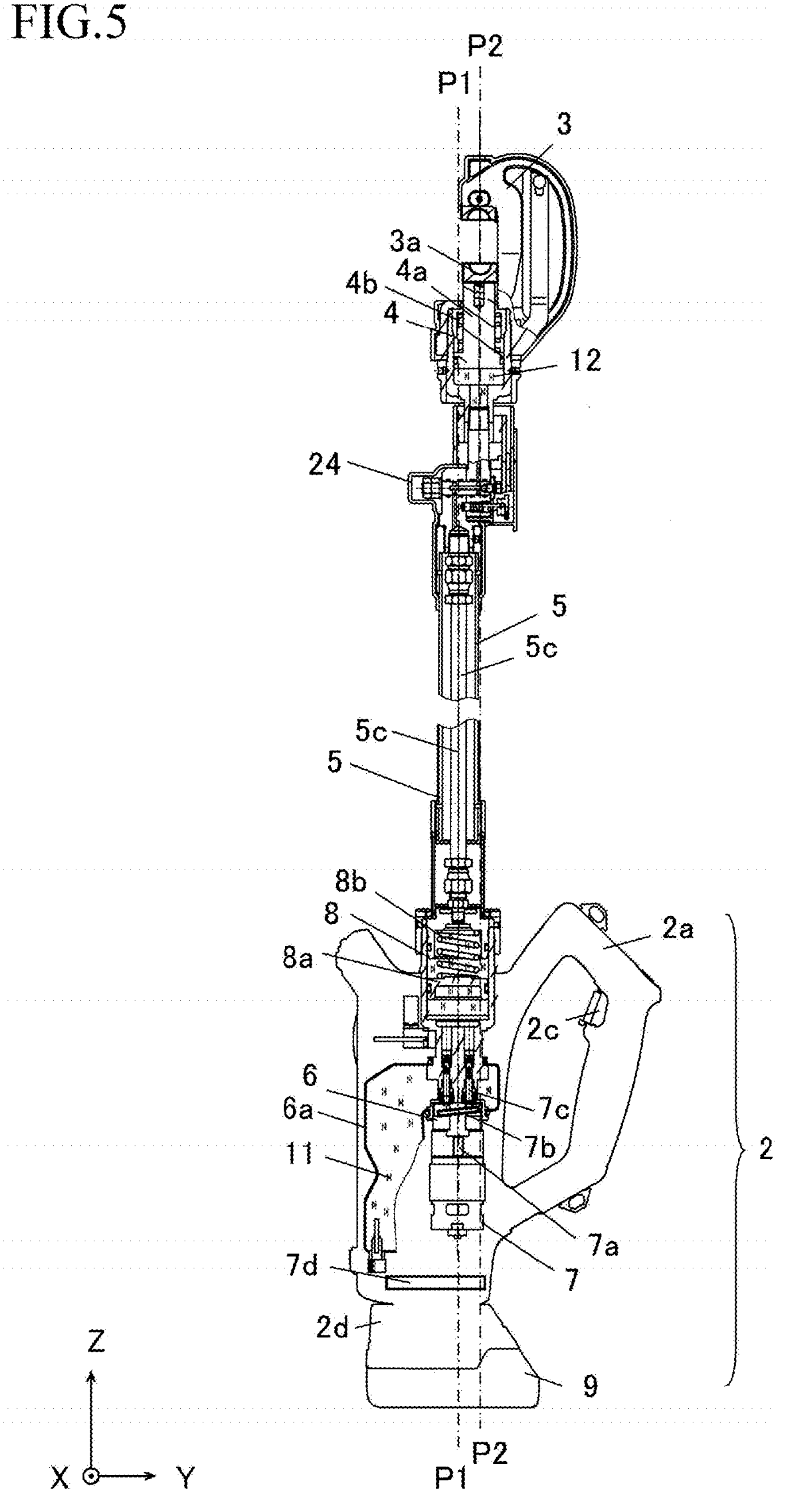
FIG. 5 is a partial section view schematically illustrating a second example of the electric tool in FIG. 1.

FIG. 5 is a partial section view schematically illustrating a second example of the electric tool 1. The example shown in FIG. 5 has a simplified configuration in which the first coupler 5*a* and the second coupler 5*b* are omitted. Therefore, the number of components can be reduced.

The present invention is not limited to the embodiments described above, and can be changed variously without departing from a scope of the present invention.

What is claimed is:

1. An electric tool comprising:

a main body having a hydraulic unit, an oil tank, a hydraulic pump for feeding hydraulic oil inside the oil tank to the hydraulic unit, a motor for driving the hydraulic pump, and a battery for supplying power to the motor;

a tool head operating by hydraulic force of a piston; and a hollow rod part configured to couple the tool head with the main body, the tool head having a processing tool, and a cylinder part includes the piston, the cylinder part and the hydraulic unit are connected by a tube part, the hydraulic unit having a partition, and the partition reciprocates along a drive axis of the motor, the hollow rod part is made of a first insulating material, the tube part includes a hydraulic hose, the hydraulic hose is made of a second insulating material, the hydraulic hose is contained within the hollow rod part, wherein the tube part includes a first coupler and a second coupler, and the first coupler is arranged at a front-end of the hollow rod part in a detachable- and attachable manner, and the second coupler is arranged at a back-end of the hollow rod part in a detachable- and attachable manner.

2. The electric tool according to claim 1, wherein the cylinder part includes a first spring built-in to bias the piston in a direction toward the hydraulic pump, and the hydraulic unit includes a second spring built-in to bias the partition in a direction toward the hydraulic pump.

3. The electric tool according to claim 2, wherein the piston, the partition, and the motor are arranged in order in a longitudinal direction, and the main body is provided with a handle arranged along the longitudinal direction.

* * * * *